Figure 1A:
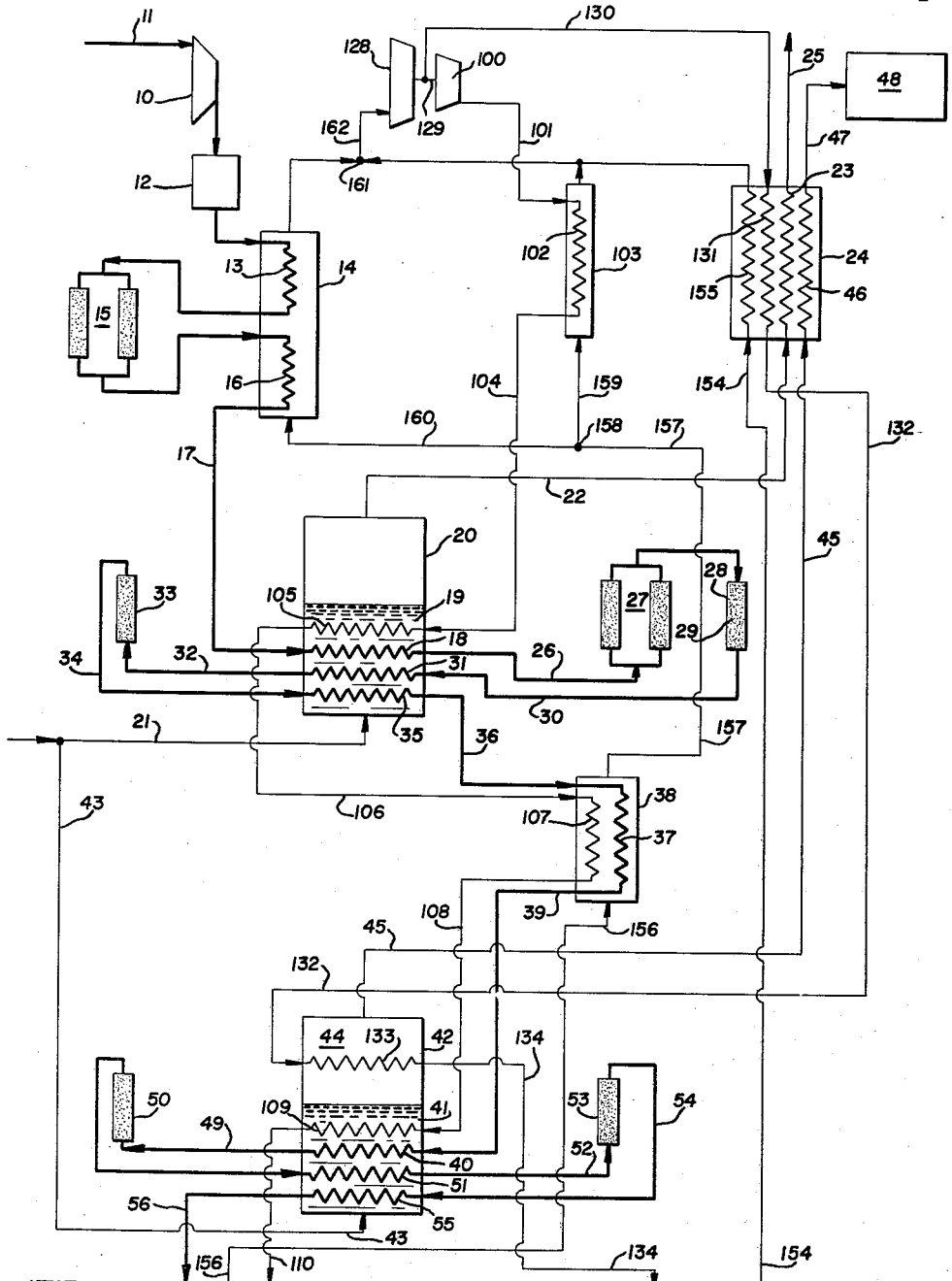

United States Patent Office 3,092,461
Patented June 4, 1963

3,092,461
PROCESS FOR PRODUCING LIQUID HYDROGEN
Peter C. Vander Arend and Lee S. Gaumer, Jr., Allentown, Pa., assignors, by mesne assignments, to Air Products and Chemicals, Inc., Trexlertown, Pa., a corporation of Delaware
Filed Jan. 20, 1960, Ser. No. 3,670
18 Claims. (Cl. 23—210)

This invention relates to the liquefaction of hydrogen and more particularly to a method of and apparatus for producing liquid hydrogen of high para composition.

It is known that normal hydrogen is a mixture of two gases referred to as ortho-hydrogen and para-hydrogen, and that the equilibrium concentration of ortho-hydrogen and para-hydrogen varies with temperature. At temperatures above about −100° F., normal hydrogen exists, that is, hydrogen having an equilibrium composition of 75% ortho-hydrogen and 25% para-hydrogen, while at lower temperatures the equilibrium composition is such that concentrations of para-hydrogen increase with decrease in temperature, the para-hydrogen concentration gradually increasing from about 25% to about 38% as the temperature decreases from about −100° F. to about −280° F. and then rapidly increases to about 100% para-hydrogen as the temperature further decreases to the boiling point of hydrogen at atmospheric pressure. Thus, liquefied normal hydrogen under atmospheric pressure as produced by conventional hydrogen liquefiers undergoes autogenous conversion of ortho-hydrogen to para-hydrogen until an equilibrium composition of about 100% para-hydrogen is established. It is also known that ortho-hydrogen conversion is an exothermic reaction releasing about 457 B.t.u./lb. mol upon conversion of normal hydrogen to 100% para-hydrogen and that autogenous conversion of ortho-hydrogen to para-hydrogen is not instantaneous but requires an appreciable time interval for its completion. Since the ortho-hydrogen conversion reaction is exothermic liquid hydrogen will continuously evaporate until 100% para-hydrogen composition is reached. The percentage of liquid hydrogen that is lost by vaporization is a function of the ortho-hydrogen composition of the liquid hydrogen at the time ortho-hydrogen conversion begins, such as the time liquid hydrogen is introduced into a storage vessel, and a function of the degree of completeness of conversion of ortho-hydrogen to para-hydrogen, that is, the storage period. It has been determined that when liquefied normal hydrogen is stored in an insulated vessel under atmospheric pressure after about eight days of autogenous conversion of ortho-hydrogen to para-hydrogen results in such a loss of liquid that only about 50% of the initially stored liquid hydrogen remains. Thus, it is not practicable to store liquefied normal hydrogen.

It has been proposed in the past to accelerate conversion of ortho-hydrogen to para-hydrogen by the use of a catalyst placed in the liquid-receiving zone of a hydrogen liquefier in intimate contact with liquefied hydrogen under atmospheric pressure. With this arrangement, it is possible to produce liquid hydrogen of high para composition which may be stored at atmospheric pressure without appreciable liquid loss.

It is therefore an object of the present invention to provide a novel method of and apparatus for producing liquid hydrogen of high para composition.

Another object is to provide a novel method of and apparatus for producing liquid hydrogen of a high para composition in which the power required per mol of product is materially less than the power requirements of prior cycles.

In accordance with the principles of the present invention, hydrogen gas during the process of its liquefaction is subjected to catalytic treatment in single or multiple conversion zones to effect conversion of ortho-hydrogen to para-hydrogen under a plurality of different temperature levels in a cycle in which hydrogen gas is expanded with work to provide refrigeration for the cycle and also to establish a temperature level for catalytic conversion.

The foregoing and other objects and features of the present invention will appear more fully from the following detailed description considered in connection with the accompanying drawings which disclose a preferred embodiment of the invention. It is to be expressly understood, however, that the drawings are designed for purposes of illustration only and not as a definition of the limits of the invention, reference for the latter purpose being had to the appended claims.

Figure 1B:
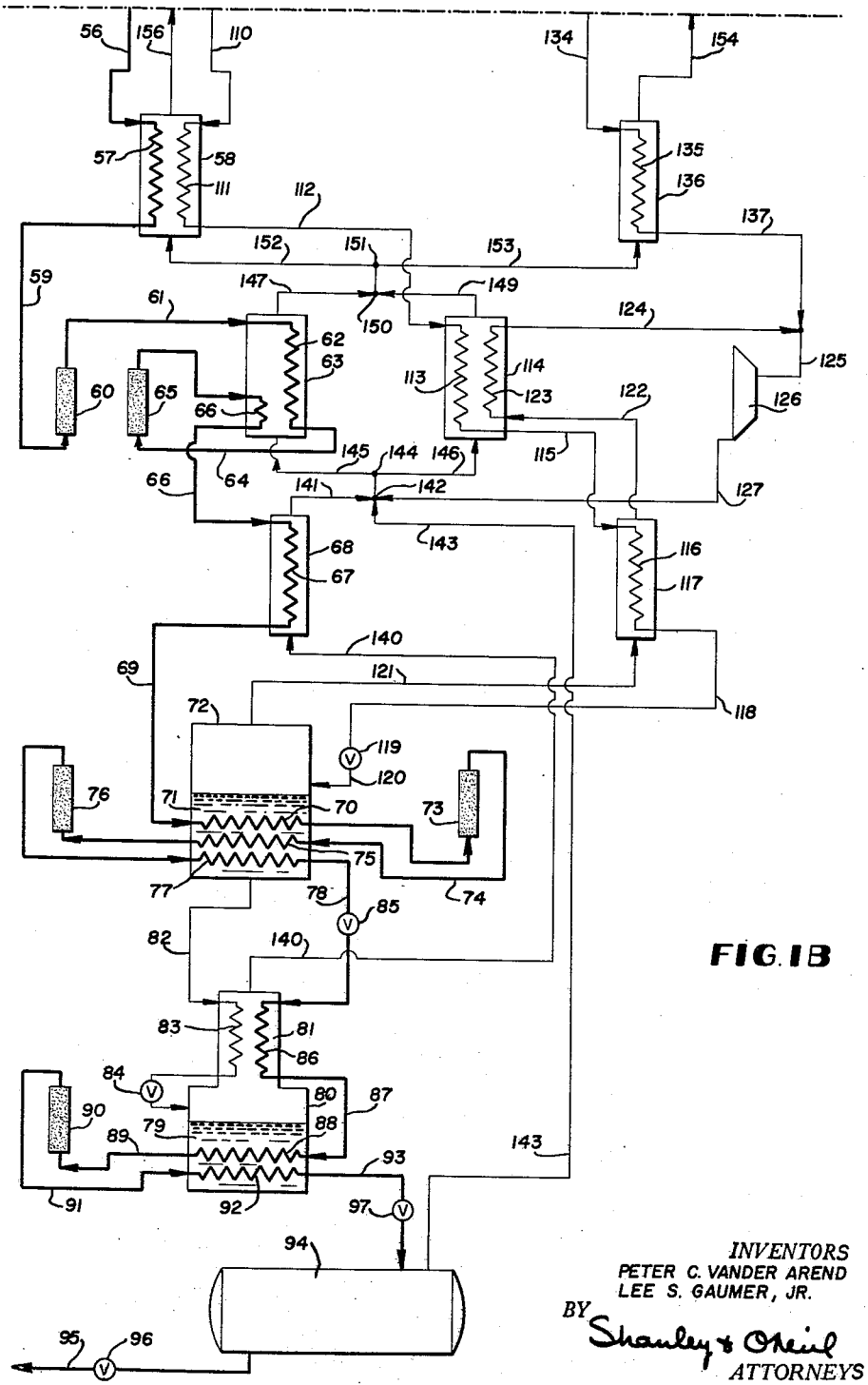

FIGURES 1A and 1B of the drawings diagrammatically illustrate a hydrogen liquefaction and conversion cycle constructed in accordance with the principles of the present invention.

With reference to the drawings, a hydrogen liquefaction and conversion cycle embodying the principles of the present invention is disclosed therein including a hydrogen feed compressor 10 fed with normal hydrogen gas through conduit 11. Hydrogen feed gas discharged from the compressor under any desired pressure such as 600 p.s.i.a., for example, is fed to a suitable drier 12 which may be of the adsorbent type for removing traces of moisture from the hydrogen feed gas, hydrogen gas being cooled by heat interchange with relatively cold gas from the cycle as well as a suitable external refrigerant prior to entering the drier. Hydrogen feed gas leaves the drier 12 at about 40° F. and then flows through passageway 13 of heat exchanger 14, the passageway 13 being located in the warm end of the heat exchanger 14 wherein the hydrogen feed gas flows in countercurrent heat exchange relationship with low pressure hydrogen gas flowing through the shell side of the heat exchanger, the low pressure hydrogen gas being derived from the cycle in a manner described below. The hydrogen feed gas leaves the cold end of the passageway 13 at a temperature of about −280° F. and is then flowed through purifier 15 for the purpose of removing traces of methane therefrom. The purifier 15 may be of the adsorber type and may be constructed in accordance with the principles disclosed in copending application of Peter C. Vander Arend and Lee S. Gaumer, Jr., Serial No. 747,429, filed July 9, 1958, for "Apparatus and Method." In accordance with the latter application, hydrogen feed gas to be purified is alternately passed through a pair of parallel connected zones filled with suitable adsorbent material which material is desorbed by alternately passing cold nitrogen gas therethrough. The hydrogen feed gas leaves the purifier 15 at a temperature of about −278° F. and is then conducted through passageway 16 located in the cold end of the heat exchanger 14 for further countercurrent heat interchange with relatively colder low pressure hydrogen vapor flowing through the shell side of the heat exchanger 14 thereby reducing the temperature of the hydrogen feed to about −294° F.

Hydrogen feed gas at about −294° F. is conducted by conduit 17 to a coil 18 immersed in a pool 19 of liquid nitrogen retained in a vessel 20 under atmospheric pressure. Liquid nitrogen under atmospheric pressure obtained from any convenient source such as a nitrogen liquefaction cycle, not shown, is supplied to the vessel 20 through conduit 21. Nitrogen vapor at a temperature of about −315° F. is withdrawn from the vessel 20 through conduit 22 and conducted thereby to passageway 23 of heat exchanger 24 for countercurrent heat interchange with other fluids of the cycle, described below, and thereby warmed to ambient temperature and withdrawn from the cycle by conduit 25 which may lead to a nitrogen liquefaction cycle.

Hydrogen feed gas flowing through the coil 18 is cooled to about −315° F., the boiling temperature of liquid nitrogen under atmospheric pressure, and the thus cooled hydrogen feed gas is conducted by conduit 26 for flow through purifier 27, the function of which is to remove traces of oxygen and nitrogen from the hydrogen feed gas. The purifier 27 may be constructed in accordance with the copending application of Peter C. Vander Arend and Lee S. Gaumer, Jr., mentioned above. From the purifier 27, the hydrogen feed gas flows through a converting device 28 which comprises a vessel filled with a suitable catalyst 29 such as a mass of particles of any one of a number of known materials capable of accelerating conversion of ortho-hydrogen to para-hydrogen, such as ferric hydroxide, for example. Hydrogen feed gas leaves the conversion device 29 at a higher temperature, around −310° F., due to the heat of conversion, and is conducted by conduit 30 to coil 31 immersed in the pool 19 of liquid nitrogen under atmospheric pressure. From the coil 31, the hydrogen feed gas at about −315° F. is conducted by conduit 32 for flow through a conversion device 33, which may be similar to the conversion device 28, wherein the hydrogen feed gas is again subject to catalytic conversion at a temperature of −315° F. The hydrogen feed gas leaving the conversion device 33 by way of conduit 34 has a composition of about 48% para-hydrogen which is the para composition in equilibrium with the temperature of liquid nitrogen boiling under atmospheric pressure. Heat generated by the conversion effected in the device 33 is removed from the hydrogen feed gas upon flowing through coil 35 immersed in the pool 19 of liquid nitrogen; 48% para-hydrogen feed being conducted from coil 35 in conduit 36 at a temperature of about −315° F.

In accordance with the principles of the present invention, catalytic conversion of ortho-hydrogen at the temperature of liquid nitrogen boiling under atmospheric pressure takes place in two stages, i.e., stages 28 and 33, in order to approach the equilibrium para-hydrogen composition with minimum power requirement. Since the conversion of ortho-hydrogen to para-hydrogen is an exothermic reaction, the conversion is accomplished in two stages, both at a temperature of −315° F., in order to approach isothermal conditions; in the first stage 28, the conditions including residence time are such that the conversion obtained is less than necessary to produce the equilibrium para-hydrogen composition while conditions in the second stage 33 are such as to obtain equilibrium para composition.

The conduit 36 conducts 48% para-hydrogen feed to passageway 37 of heat exchanger 38 for countercurrent heat interchange with relatively cold gaseous hydrogen, discussed below, flowing through the shell side of the heat exchanger 38 to thereby cool the hydrogen feed to about −337° F. The thus cooled hydrogen feed is conducted by conduit 39 for flow through a coil 40 immersed in a pool 41 of liquid nitrogen boiling under subatmospheric pressure, such as a pressure of 2 p.s.i.a., in a closed vessel 42. Liquid nitrogen is supplied to the vessel 42 by conduit 43 having a connection with the source of liquid nitrogen through the conduit 21 and the vapor space 44 in the vessel 43 communicates with a conduit 45 connected through passageway 46 of the heat exchanger 24 and conduit 47 to a vacuum source 48. Liquid nitrogen in the pool 41 boiling under a pressure of about 2 p.s.i.a. is at a temperature of about −343° F., and 48% para-hydrogen feed is cooled to that temperature upon flowing through the coil 40. From the coil 40, the hydrogen feed is conducted by conduit 49 to a first stage conversion device 50, then through coil 51 immersed in the pool 41 of liquid nitrogen to remove the heat of first stage conversion, then by conduit 52 for flow through a second stage conversion device 53, and then passed by conduit 54 through coil 55 immersed in the pool 41 of liquid nitrogen to remove the heat of second stage conversion. The conversion devices 50 and 54 are filled with a suitable catalyst for accelerating conversion of ortho-hydrogen to para-hydrogen and the hydrogen feed leaving the coil 55 through conduit 56 has a para composition in equilibrium with the temperature of liquid nitrogen bath 41, that is, of about 58%. As in the case of conversion devices 28 and 33, the conversion that takes place in the first stage 50 is less than the equilibrium composition obtained in the second stage 53 in order to reduce power requirements.

As shown on FIGURE 1B, 58% para-hydrogen feed at a temperature of about −343° F. flows by way of the conduit 56 through passageway 57 of heat exchanger 58 for heat interchange with relatively cold gaseous hydrogen flowing through the shell side of the heat exchanger 58, the relatively cold gaseous hydrogen being derived from the cycle in a manner described below. The 58% para-hydrogen feed leaves the cold end of the passageway 57 at a temperature of about −361° F. and at that temperature is passed by a conduit 59 through a conversion device 60 to effect further ortho-hydrogen conversion and provide hydrogen feed having a composition of about 63% para-hydrogen. The 63% para-hydrogen feed is then conducted by conduit 61 to passageway 62 of a heat exchanger 63 for countercurrent heat interchange with relatively cold hydrogen gas flowing through the shell side of the heat exchanger, the relatively cold hydrogen gas being derived from the cycle as described below. The 63% para-hydrogen feed is cooled to a temperature of about −393° F. upon flowing through the passageway 63 and at that temperature is conducted by conduit 64 to a conversion device 65 wherein further ortho-hydrogen conversion takes place to provide a para-hydrogen composition in equilibrium with the existing temperature, that is about 78% para-hydrogen. From the conversion device 65, the 78% para-hydrogen feed is conducted through passageway 66 of the heat exchanger 62 to remove the heat of conversion and cool the hydrogen feed to a temperature of about −393° F. and is then conducted by way of conduit 66 for flow through passageway 67 of a heat exchanger 68 whereby its temperature is reduced to about −397° F. upon countercurrent heat interchange with relatively cold hydrogen gas flowing through the shell side of the heat exchanger. From the passageway 67, the 78% para-hydrogen feed is passed to coil 70 immersed in a pool 71 of liquid hydrogen contained within a vessel 72. The pool of liquid hydrogen 71 is maintained under a superatmospheric pressure such as about 100 p.s.i.a., for example, to establish a temperature level of about −404° F. The portion of the cycle which functions to provide the liquid hydrogen in the vessel 72 is described below. The 78% para-hydrogen feed flowing through the coil 70 is cooled to a temperature of about −404° F. and at that temperature the hydrogen feed is passed through a first stage conversion device 73 and thereafter conducted by conduit 74 through coil 75 immersed in the bath of liquid hydrogen 71 to remove the heat of first stage conversion and then at the temperature of about −404° F. is passed through a second stage conversion device 76. Thereafter, the hydrogen feed is passed through coil 77 immersed in the pool 71 of liquid hydrogen to remove the heat of second stage conversion and is delivered from the coil 77 by way of conduit 78. The conversion devices 73 and 76 operate in a manner similar to conversion devices 28, 33 and 50, 53 to establish a para-hydrogen composition in equilibrium with the existing temperature; the para-hydrogen composition at the temperature of the bath 71 of liquid hydrogen being about 90% para-hydrogen.

The final conversion of the hydrogen feed takes place under a temperature of liquid hydrogen boiling under atmospheric pressure. For this purpose, a pool 79 of liquid hydrogen under atmospheric pressure is provided in a vessel 80 having a vapor zone 81. Liquid hydrogen forming the pool 79 is obtained by withdrawing liquid hydrogen under superatmospheric pressure from the pool 71 of vessel 72 through conduit 82, passing the thus withdrawn high pressure liquid hydrogen through passageway 83 in heat exchange with the vapor zone 81 thereby cooling the hydrogen to about −407° F., and then expanding the subcooled liquid hydrogen in valve 84 and introducing the expanded hydrogen into the vessel 80 at a temperature of about −422° F.

The 90% para-hydrogen feed in the conduit 78 is expanded in valve 85 to a lower superatmospheric pressure, such as 120 p.s.i.a., for example, and then conducted through passageway 86 in heat exchange with the vapor zone 81 of the vessel 80 and thereby cooled to a temperature of about −407° F. Thereafter, the 90% para-hydrogen feed is conducted by conduit 87 through coil 88 immersed in the pool 79 of liquid hydrogen and is thereby cooled to about −421° F. The 90% para-hydrogen feed at the latter temperature is conducted by conduit 89 through conversion device 90 wherein the final ortho-hydrogen conversion takes place to provide about 95% para-hydrogen. The heat of this conversion is removed by conducting the 95% para-hydrogen by way of conduit 91 through coil 92 immersed in the bath of liquid hydrogen. The 95% para-hydrogen product leaves the coil 92 at a temperature of about −421° F. and is conducted by way of conduit 93 to a storage vessel 94 from which it may be withdrawn through conduit 95 having a control valve 96. An expansion valve 97 in conduit 93 functions to reduce the pressure of the 95% para-hydrogen product as required for transferring the product to the storage vessel under desired pressure. The 95% para-hydrogen product leaving the coil 92 is totally in liquid phase. The point in the flow of the hydrogen feed through the cycle at which liquefaction occurs depends upon the temperature and pressure of the hydrogen feed. In the present example, the hydrogen feed on the high pressure side of the expansion valve 85 is under a pressure greater than the critical pressure of hydrogen and hence liquefied hydrogen feed is not present until expansion in valve 85 to below the critical pressure. The feature of expanding the hydrogen feed to below the critical pressure prior to heat interchange with liquid hydrogen under atmospheric pressure prevents vapor flashing during the expansion step. It is preferred that the hydrogen feed be expanded in the valve 85 to a pressure greater than the pressure existing in the vessel 72.

The portion of the cycle which supplies liquid hydrogen under superatmospheric pressure to the vessel 72 includes a gaseous hydrogen compressor 100 which delivers to discharge conduit 101 gaseous hydrogen under relatively high pressure, such as 600 p.s.i.a., for example, and at a temperature of about 100° F. The conduit 101 conducts the high pressure gaseous hydrogen through passageway 102 of heat exchanger 103 in countercurrent heat interchange with relatively cold low pressure hydrogen gas flowing through the shell side of the heat exchanger 103 thereby cooling the high pressure gaseous hydrogen to about −295° F. At that temperature the high pressure gaseous hydrogen is conducted by conduit 104 for flow through coil 105 immersed in the pool 19 of liquid nitrogen boiling under atmospheric pressure to thereby further cool the high pressure gaseous hydrogen to about −315° F. The thus cooled high pressure gaseous hydrogen is then conducted by conduit 106 for flow through passageway 107 of the heat exchange device 38 whereby its temperature is reduced to about −337° F. and then conducted by conduit 108 through coil 109 immersed in the pool 41 of liquid nitrogen boiling under subatmospheric pressure to further reduce its temperature. From the coil 109 the high pressure hydrogen is conducted by conduit 110 for flow through passageway 111 of heat exchanger 58 where its temperature is reduced to about −361° F., then conducted by conduit 112 to passageway 113 of heat exchanger 114 wherein the high pressure hydrogen is further cooled to about −393° F. and then conducted by conduit 115 through passageway 116 of heat exchanger 117 for further countercurrent heat exchange effecting relation with relatively cold low pressure gaseous hydrogen thereby further reducing its temperature to about −397° F. From the heat exchanger 117 the high pressure hydrogen is conducted by conduit 118 to expansion valve 119 where its pressure is reduced to about 100 p.s.i.a.; the expanded hydrogen is at a temperature of about −404° F. and is partly in liquid phase and is introduced through conduit 120 into the vessel 72. The conduit 120 may be provided with a filter to remove solid impurities. The quantity of liquid hydrogen introduced into the vessel 72 is sufficient to replenish liquid loss from the pool 71 due to vaporization by heat interchange with the hydrogen feed in coils 70, 75 and 77 and by normal heat leak.

Intermediate pressure gaseous hydrogen comprising gaseous hydrogen not liquefied upon expansion in valve 119 and gaseous hydrogen produced upon vaporization of liquid hydrogen in the vessel 72 is withdrawn from the vessel 72 at a temperature of about −404° F. by way of conduit 121 and passed to the shell side of heat exchanger 117 in countercurrent heat interchange with high pressure gaseous hydrogen as described above whereby its temperature is raised to about −396° F. The thus warmed intermediate pressure gaseous hydrogen is conducted by conduit 122 to passageway 123 of heat exchanger 114 for countercurrent heat interchange with warmer high pressure gaseous hydrogen thereby further raising the temperature of the intermediate pressure gaseous hydrogen to about −371° F. Intermediate pressure gaseous hydrogen at the latter temperature is passed through conduit 124 and conduit 125 to the inlet of an expansion turbine 126 wherein the gaseous hydrogen is expanded with the production of work to about atmospheric pressure and a temperature of about −396° F.; the effluent from the expansion engine 126 is fed through conduit 127 for utilization in the cycle to provide refrigeration and also establish one of the conversion temperature levels as described in detail below.

Gaseous hydrogen under the intermediate pressure is also supplied to the inlet of the expansion turbine 126 from an intermediate pressure hydrogen compressor 128 which may feed the high pressure hydrogen compressor 100 through conduit 129. Intermediate pressure gaseous hydrogen is supplied from compressor 128 in conduit 130 and conducted thereby to passageway 131 of the heat exchanger 24 where it is cooled to about −334° F. upon countercurrent heat interchange with nitrogen vapor under atmospheric pressure from the vessel 20 and nitrogen vapor under subatmospheric pressure from the vessel 42 respectively flowing through passageways 23 and 46 of the heat exchanger 24. The intermediate pressure gaseous hydrogen is then conducted by conduit 132 to passageway 133 in heat exchange with nitrogen vapor under subatmospheric pressure in the vapor zone 44 of the vessel 42 whereby its temperature is reduced to about −343° F. Thereafter, the intermediate pressure gaseous hydrogen is conducted by conduit 134 to passageway 135 of heat exchanger 136 for countercurrent heat interchange with relatively cold hydrogen gas under low pressure flowing through the shell side of the heat exchanger. The latter heat exchange step further reduces the temperature of the intermediate pressure gaseous hydrogen to about −361° F. and at that temperature it is conducted by conduit 137 to the conduit 125 and hence to the inlet of the expansion turbine 126.

The inlet to the intermediate pressure compressor 128 comprises gaseous hydrogen under substantially atmospheric pressure produced during normal operation of the cycle as well as effluent of the expansion engine 126. As shown in FIGURE 1B, gaseous hydrogen under substantially atmospheric pressure and at a temperature of about −408° F., which comprises hydrogen flashed upon expansion of liquid intermediate pressure hydrogen in the valve 84 as well as vaporized liquid hydrogen, is withdrawn from the vapor space 81 of the vessel 80 by way of conduit 140 and conducted thereby to the shell side of the heat exchanger 68 to effect cooling of the hydrogen feed, as described above, and warming of the low pressure gaseous hydrogen to about −396° F. The warmed gaseous hydrogen is then conducted by conduit 141 to point 142 where it is merged with gaseous hydrogen effluent of the expansion engine as well as with hydrogen vapor also at a temperature of about −396° F. withdrawn from the storage vessel 94 by way of conduit 143. The thus combined low pressure gaseous hydrogen is divided at point 144 by conduit 145 and conduit 146, the conduit 145 conducting one portion of the low pressure gaseous hydrogen to the shell side of the heat exchanger 63 in countercurrent heat exchange effecting relation with hydrogen feed while the conduit 146 conducts the remaining portion of the low pressure gaseous hydrogen through the shell side of the heat exchanger 114 in countercurrent heat exchange effecting relation with intermediate pressure gaseous hydrogen flowing through the passageway 113. The portions of low pressure gaseous hydrogen at a temperature of about −370° F. leave the heat exchangers 63 and 114 through conduits 147 and 148, respectively, and are merged together at point 150 and then divided at point 151 into two further portions, one portion flowing through conduit 152 to the shell side of heat exchanger 58 for countercurrent heat exchange effecting relation with hydrogen feed and high pressure gaseous hydrogen and another portion conducted by conduit 153 to the shell side of the heat exchanger 136 for countercurrent heat interchange with intermediate pressure gaseous hydrogen. The second portion of the low pressure gaseous hydrogen is warmed to about −345° F. upon flowing through the heat exchanger 136 and is then conducted by conduit 154 to passageway 155 of heat exchanger 24 and warmed to about 86° F. upon countercurrent heat interchange with intermediate pressure gaseous hydrogen flowing through the passageway 131. The other portion of the low pressure gaseous hydrogen leaves the shell side of the heat exchanger 58 at about −345° F. and is then conducted by way of conduit 156 to the shell side of heat exchanger 38 where it is warmed to about −316° F. in countercurrent heat interchange with hydrogen feed and high pressure gaseous hydrogen. From the latter heat exchanger the low pressure hydrogen gas is conducted by conduit 157 to point 158 where it is divided into two sub-portions, one sub-portion flowing through conduit 159 to the shell side of heat exchanger 103 in countercurrent heat interchange with the high pressure gaseous hydrogen and anothter sub-portion flowing through conduit 160 to the shell side of heat exchanger 14 for countercurrent heat exchange effecting relation with hydrogen feed. The low pressure gaseous hydrogen from the warm end of the passageway 155 of the heat exchanger 24, from the shell side of the heat exchanger 103 and from the shell side of the heat exchanger 114 are merged at point 161 and conducted by conduit 162 to the inlet of the low pressure hydrogen compressor 128.

The present invention thus provides a novel liquefaction and conversion cycle capable of producing liquid hydrogen of high para composition, of the order of 95% para-hydrogen and greater, with minimum power requirements. The features of effecting catalytic conversion of ortho-hydrogen to para-hydrogen at a plurality of different temperature levels and of employing plural stages of conversion at similar temperature levels attribute to the power savings obtained by cycles constructed according to the present invention. Also, the improved efficiency also results from the provision of a cycle in which fluids are expanded with work to provide refrigeration as well as a conversion temperature level.

Although only one embodiment of the invention has been disclosed and described herein, it is to be expressly understood that various substitutions and modifications may be made therein without departing from the spirit of the invention as well understood by those skilled in the art. Reference therefore will be had to the appended claims for a definition of the limits of the invention.

What is claimed is:

1. Process for producing liquid hydrogen of high para composition which comprises cooling hydrogen feed to provide liquid hydrogen, effecting catalytic conversion of ortho-hydrogen to para-hydrogen while cooling the hydrogen feed, the catalytic conversion taking place at a plurality of different temperature levels including conversion in a plurality of stages at substantially constant temperature.

2. Process for producing liquid hydrogen of high para composition which comprises passing hydrogen feed through a series of heat exchange zones to cool hydrogen feed to liquefaction temperature, and catalytically treating hydrogen feed to effect conversion of ortho-hydrogen to para-hydrogen at temperatures corresponding to the temperature of hydrogen feed in a plurality of the heat exchange zones, the last-named step including plural catalytic treatment of hydrogen feed in a plurality of stages under constant temperature.

3. Process for producing liquid hydrogen of high para composition which comprises passing hydrogen feed through a plurality of heat exchange zones to cool hydrogen feed to liquefaction temperature, a first of the zones being cooled by liquid nitrogen boiling under atmospheric pressure and a second zone being cooled by liquid hydrogen boiling under atmospheric pressure and intermediate zones being at temperatures between the temperature of the first and second zones, and catalytically treating hydrogen feed at the temperature of the zones to effect conversion of ortho-hydrogen to para-hydrogen, the catalytic treatment of hydrogen feed at certain of the zones taking place in plural stages under substantially constant temperature.

4. Process for producing liquid hydrogen of high para composition as defined in claim 3 in which one of the intermediate zones is cooled by liquid hydrogen boiling under superatmospheric pressure.

5. Process for producing liquid hydrogen of high para composition as defined in claim 4 in which gaseous hydrogen under superatmospheric pressure is withdrawn from the one intermediate zone and expanded with work to establish a temperature level for another zone of the intermediate zones.

6. Process for producing liquid hydrogen of high para composition which comprises passing hydrogen feed through a series of heat exchange zones in heat interchange with relatively cold fluids to cool the hydrogen feed to liquefaction temperature, passing compressed gas through heat exchange zones of the series and cooling the compressed gas to liquefaction temperature to provide liquid for cooling one of the zones, withdrawing vapor from the one zone, expanding with work the withdrawn vapor, passing effluent of the work expansion step to another zone at a temperature warmer than the temperature of the one zone, and catalytically treating hydrogen feed at the temperature of the zones to effect conversion of ortho-hydrogen to para-hydrogen.

7. Process for producing liquid hydrogen of high para composition as defined in claim 6 in which the hydrogen feed is catalytically treated in plural stages at the temperature level of at least two of the zones.

8. Process for producing liquid hydrogen of high para composition as defined in claim 6 in which effluent of the expansion is passed in countercurrent heat interchange wth hydrogen feed.

9. Process for producing liquid hydrogen of high para composition as defined in claim 6 in which effluent of the expansion step is passed in countercurrent heat interchange with hydrogen feed and compressed gas.

10. Process for producing liquid hydrogen of high para composition as defined in claim 6 in which effluent of the expansion step is passed in heat interchange with hydrogen feed and then compressed to a high pressure to form the compressed gas.

11. Process for producing liquid hydrogen of high para composition which comprises passing hydrogen feed through a series of heat exchange zones in heat interchange with relatively cold fluids at different temperatures to cool the hydrogen feed to liquefaction temperature, providing a source of compressed gas, cooling compressed gas including the step of passing compressed gas through at least one heat exchange zone of the series, further cooling and expanding one portion of the compressed gas and providing cold liquid for another zone of the series, withdrawing vapor from said another zone, expanding with work withdrawn vapor and passing effluent of such work expansion to still another zone of the series, expanding another portion of compressed gas with work and passing effluent of such work expansion in countercurrent heat interchange with hydrogen feed, and catalytically treating hydrogen feed at the temperature of a plurality of the zones to effect conversion of ortho-hydrogen to para-hydrogen.

12. Process for producing liquid hydrogen of high para composition as defined in claim 11 in which the hydrogen feed is catalytically treated in plural stages under substantially uniform temperature at the temperature level of at least two of the zones.

13. Process for producing liquid hydrogen of high para composition as defined in claim 11 in which the effluent of the second-named expansion step is used to cool one of the zones.

14. Process for producing liquid hydrogen of high para composition as defined in claim 13 in which effluent of the first and the second-named expansion steps is passed in countercurrent heat interchange with hydrogen feed and compressed gas and then compressed to form compressed gas.

15. Process for producing liquid hydrogen of high para composition as defined in claim 14 in which the compressed gas comprises hydrogen.

16. Process for producing liquid hydrogen of high para composition as defined in claim 11 in which the warmest heat exchange zone is cooled by liquid nitrogen boiling under atmospheric pressure and the next coldest heat exchange zone is cooled by liquid nitrogen boiling under subatmospheric pressure.

17. Process for producing liquid hydrogen of high para composition as defined in claim 16 in which the coldest heat exchange zone is cooled by liquid hydrogen boiling under atmospheric pressure and in which the one heat exchange zone is at a temperature closest to the coldest heat exchange zone.

18. Process for producing liquid hydrogen of high para composition which comprises cooling hydrogen and catalytically treating cooled hydrogen in a plurality of stages at substantially constant temperature to effect conversion of ortho-hydrogen to para-hydrogen.

References Cited in the file of this patent

UNITED STATES PATENTS 2,937,076  Class et al. _____ May 17, 1960